US011288234B2

(12) United States Patent
Chennamsetty et al.

(10) Patent No.: US 11,288,234 B2
(45) Date of Patent: *Mar. 29, 2022

(54) PLACEMENT OF DATA FRAGMENTS GENERATED BY AN ERASURE CODE IN DISTRIBUTED COMPUTATIONAL DEVICES BASED ON A DEDUPLICATION FACTOR

(71) Applicant: INTERNATIONAL BUSINESS MACHINES CORPORATION, Armonk, NY (US)

(72) Inventors: Ramamohan Chennamsetty, Highland, NY (US); Blaine H. Dolph, Western Springs, IL (US); Sandeep R. Patil, Pune (IN); Riyazahamad M. Shiraguppi, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 482 days.

This patent is subject to a terminal disclaimer.

(21) Appl. No.: 16/286,560

(22) Filed: Feb. 26, 2019

(65) Prior Publication Data
US 2019/0197023 A1    Jun. 27, 2019

Related U.S. Application Data

(63) Continuation of application No. 14/307,395, filed on Jun. 17, 2014, now Pat. No. 10,242,020.

(51) Int. Cl.
G06F 16/174    (2019.01)
(52) U.S. Cl.
CPC .................. G06F 16/1748 (2019.01)
(58) Field of Classification Search
CPC ......... G06F 17/30159; G06F 17/30156; G06F 16/1748
See application file for complete search history.

(56) References Cited

U.S. PATENT DOCUMENTS 8,280,854 B1*  10/2012  Emmert ............... G06F 16/185
                                                    707/664
2003/0135514 A1*  7/2003  Patel ................. G06F 11/1076
(Continued)

FOREIGN PATENT DOCUMENTS

WO    2012029258 A1    3/2012

OTHER PUBLICATIONS

"An Efficient Method to Redistribute Deduplication Data Across Nodes Supporting Global Deduplication", Symantec Corporation, IP.com Prior Art Database Technical Disclosure, IP.com No. IPCOM000218968D, Jun. 13, 2012, pp. 5.

(Continued)

Primary Examiner — Etienne P Leroux
Assistant Examiner — Farhad Agharahimi
(74) Attorney, Agent, or Firm — Konrad Raynes Davda & Victor LLP; Rabindranatha Dutta

(57) ABSTRACT

A file division and erasure code application executing in a controlling computational device generates data fragments and parity fragments of a file. Each of the generated data fragments and parity fragments are distributed in a different distributed computational device of a plurality of distributed computational devices, where distributing of a generated data fragment comprises determining whether any distributed computational device already stores a duplicate copy of the generated data fragment, and if any distributed computational device already stores the duplicate copy of the generated data fragment, placing the generated data fragment in the distributed computational device if no other data or parity fragment of the file has already been placed in the distributed computational device.

18 Claims, 9 Drawing Sheets

(56) References Cited

U.S. PATENT DOCUMENTS

| | | | |
|---|---|---|---|
| 2008/0228691 A1* | 9/2008 | Shavit | G06F 16/9014 |
| 2009/0235022 A1* | 9/2009 | Bates | G06F 11/1084 |
| | | | 711/114 |
| 2010/0064166 A1 | 3/2010 | Dubnicki et al. | |
| 2013/0036277 A1* | 2/2013 | Szczepkowski | G06F 12/0811 |
| | | | 711/159 |

OTHER PUBLICATIONS

"Method for I/O Performance Improvement in Erasure Code Environment", IP.com Prior Art Database Technical Disclosure, IP.com No. IPCOM000228152D, Jun. 10, 2013, pp. 8.

U.S. Appl. No. 14/307,395, filed Jun. 17, 2014.

Office Action dated Jun. 23, 2016, pp. 24, for U.S. Appl. No. U.S. Appl. No. 14/307,395, filed Jun. 17, 2014.

Response dated Sep. 23, 2016, pp. 19, to Office Action dated Jun. 23, 2016, pp. 24, for U.S. Appl. No. U.S. Appl. No. 14/307,395, filed Jun. 17, 2014.

Final Office Action dated Jan. 12, 2017, pp. 21, for U.S. Appl. No. 14/307,395, filed Jun. 17, 2014.

Notice of Appeal and Pre-Appeal Brief Request filed Apr. 12, 2017 for U.S. Appl. No. 14/307,395, filed Jun. 17, 2014.

Appeal Brief filed Jun. 26, 2017, pp. 29, for U.S. Appl. No. 14/307,395, filed Jun. 17, 2014.

Notice of Allowance dated Nov. 15, 2018, pp. 11, U.S. Appl. No. 14/307,395, filed Jun. 17, 2014.

List of IBM Patents and Applications treated as related, dated Feb. 26, 2019, pp. 2.

* cited by examiner

PLACEMENT OF DATA FRAGMENTS GENERATED BY AN ERASURE CODE IN DISTRIBUTED COMPUTATIONAL DEVICES BASED ON A DEDUPLICATION FACTOR

CROSS-REFERENCE TO RELATED APPLICATION

This application is a continuation of U.S. patent application Ser. No. 14/307395, filed Jun. 17, 2014, which application is incorporated herein by reference in its entirety.

BACKGROUND

1. Field

Embodiments relate to the placement of data fragments generated by an erasure code in distributed computational devices based on a deduplication factor.

2. Background

In a distributed file system, one or more central servers may store files that may be accessed, with proper authorization rights, by any number of remote clients in the network. Just as an operating system organizes files in a hierarchical file management system, the distributed system may employ a uniform naming convention and a mapping scheme to keep track of locations where the files are located. When the client device retrieves a file from the server, the file appears as a regular file on the client machine, and the user is able to use the file in the same way as if it were stored locally. When the user completes usage of the file, the updated file is returned over the network to the server, and the server stores the updated file for retrieval at a later time. Distributed file systems may be advantageous because they make it easier to distribute documents to multiple clients and they provide a centralized storage system such that client machines are not using their resources to store files.

Data Deduplication is a storage mechanism in which redundant data is eliminated to significantly shrink storage requirements and improve bandwidth efficiency. In the deduplication process, duplicate data is deleted, leaving only one copy of the data to be stored. This single copy is called as master copy and the deleted copies (secondary copies) keeps a reference pointer which points to this master copy.

"Big Data" is a term that refers to data sets so large and complex that they may have to be processed by specially designed hardware and software tools. The data sets are typically of the order of Terabyte or Exabyte in size. These data sets are created from a diverse range of sources, such as sensors that gather climate information, publicly available information such as magazines, newspapers, articles, etc. Other examples where big data is generated include purchase transaction records, web logs, medical records, military surveillance, video and image archives, and e-commerce. There is a heightened interest in Big Data as enormous amount of digital data is being created from the interaction between individuals, businesses, and government agencies. There are significant benefits in effectively identifying, accessing, filtering, analyzing and selecting parts of this data. The processing of massive amounts of Big Data a necessity for advanced storage infrastructures.

SUMMARY OF THE PREFERRED EMBODIMENTS

Provided are a method, a system, and a computer program product in which a file division and erasure code application executing in a controlling computational device generates data fragments and parity fragments of a file. Each of the generated data fragments and parity fragments are distributed in a different distributed computational device of a plurality of distributed computational devices, wherein distributing of a generated data fragment comprises determining whether any distributed computational device already stores a duplicate copy of the generated data fragment, and if any distributed computational device already stores the duplicate copy of the generated data fragment, placing the generated data fragment in the distributed computational device if no other data or parity fragment of the file has already been placed in the distributed computational device.

In certain embodiments, in response to determining that no distributed computational device already stores the duplicate copy of the generated data fragment, the generated data fragment is placed in a distributed computational device in which no other data or parity fragment of the file has already been placed.

In further embodiments, data fragments stored in each of the plurality of distributed computational devices are deduplicated.

In yet further embodiments, the controlling computational device stores metadata of files stored in the plurality of distributed computational devices, wherein the metadata includes the location of each of the data and parity fragments in each of the plurality of distributed computational devices, and wherein the determining of whether any distributed computational device already stores a duplicate copy of the generated data fragment is performed by using hash values of data fragments of a plurality of files stored in a hash repository in the controlling computational device.

In certain embodiments, the file division and erasure code application generates a predetermined number of parity fragments corresponding to the file, and the file is recovered when no more than the predetermined number of distributed computational devices have failed.

In additional embodiments, each of the plurality of distributed computational devices have a deduplication application to deduplicate the data fragments, and a number of the data fragments is greater than a number of the parity fragments for the file.

In further embodiments, a removal of least one data fragment already placed in the distributed computational device is performed for placing the generated data fragment in the distributed computational device if the distributed computational device already stores the duplicate copy of the generated data fragment. The at least one data fragment that is removed is not a duplicate of any other data fragments stored in the distributed computational device, and the at least one data fragment that is removed is placed in some other distributed computational device subsequent to being removed from the distributed computational device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made, Often there is redundancy in large data sets of "Big Data" and deduplicated data may be stored to reduce the amount of storage capacity needed. Additionally large data sets may have to be stored redundantly so that in case of failure of computational nodes, data recovery is possible.

Certain embodiments provide a distributed data storage environment for large data sets, using erasure codes where deduplication is employed at each distributed computational devices where data fragments are stored. The erasure code provides redundancy by breaking objects up into smaller fragments and storing the fragments in different computational devices. The data is recoverable from combinations of a smaller number of those fragments when certain fragments have been lost. In certain embodiments, the computational node for storing a given file erasure code fragment is selected based on the already present data contents so as to facilitate deduplication.

In certain embodiments, file level splitting and file level erasure code ensures that maximum data is local to a computational device. Additionally, in certain embodiments, selection of a distributed computational device for storing a data fragment is based on the already present data at the distributed computational device.

Exemplary Embodiments

Figure 1:
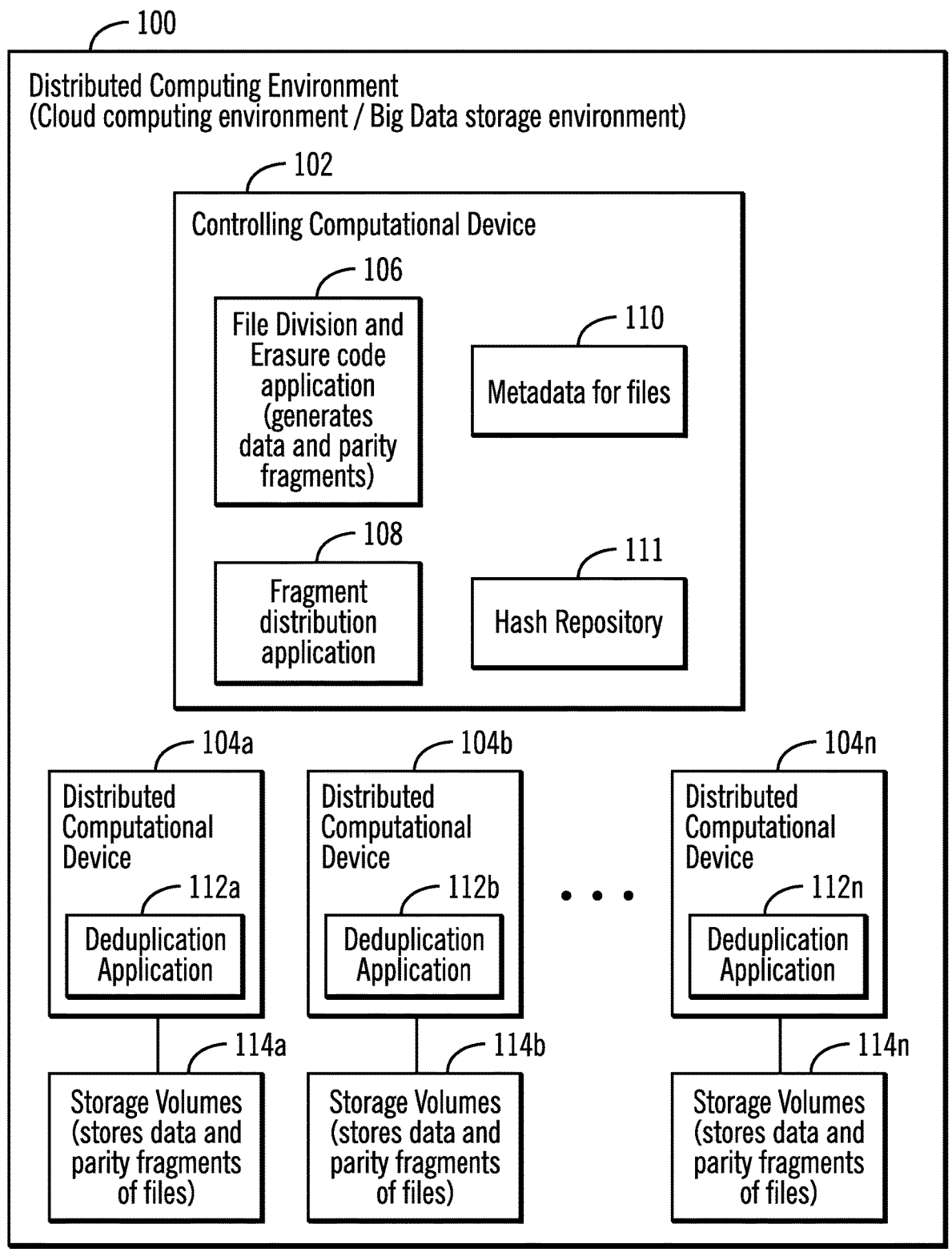
FIG. 1 illustrates a block diagram of a distributed computing environment comprising a controlling computational device and a plurality of distributed computational devices, in accordance with certain embodiments.

FIG. 1 illustrates a block diagram 100 of a distributed computing environment comprising a controlling computational device 102 and a plurality of distributed computational devices 104a, 104b, . . . , 104n, in accordance with certain embodiments.

The controlling computational device 102 and the plurality of distributed computational devices 104a, 104b, . . . , 104n may comprise any suitable computational device including those presently known in the art, such as, a personal computer, a workstation, a server, a mainframe, a hand held computer, a palm top computer, a telephony device, a network appliance, a blade computer, a processing device, etc. The controlling computational device 102 and the plurality of distributed computational devices 104a, 104b, . . . , 104n may be elements in any suitable network, such as, a storage area network, a wide area network, the Internet, an intranet. In certain embodiments, the controlling computational device 102 and a plurality of distributed computational devices 104a, 104b, . . . , 104n may be elements in a cloud computing environment or a "Big Data" storage environment.

The controlling computational device 102 may include a file division and erasure code application 106 that generates data and parity fragments of a file. In certain embodiments, an erasure code implemented by the file division and erasure code application is a forward error correction (FEC) code for the binary erasure channel, which transforms a message of k symbols into a longer message (code word) with n symbols such that the original message may be recovered from a subset of the n symbols. An erasure code provides redundancy by breaking objects up into smaller fragments and storing the fragments in different places. The key is that the data may be recovered from any combination of a smaller number of these fragments. When recovering data, it is important to know if any fragment is corrupted. It is also important to identify the data to ensure immutability. A secure verification hashing scheme may be needed to both verify and identify data fragments.

The controlling computational device 102 may also include a fragment distribution application 108 that distributes the data and parity fragments generated by the file division and erasure code application 106 among the plurality of distributed computational devices 104a . . . 104n.

The controlling computational device 102 also stores the metadata 110 for the files whose data and parity fragments have been distributed among the plurality of distributed computational devices 104a . . . 104n. The metadata 110 may include pointers or other location indicators that indicate where each data and parity fragment of a file is stored.

The controlling computational device 102 also stores a hash repository 111 that stores hash values corresponding to data fragments of files for determining relatively quickly whether two data fragments are duplicative of each other.

Each of the distributed computational devices 104a, 104b, . . . , 104n may be configured to execute a deduplication application 112a, 112b, . . . 112n. A deduplication application for a distributed computational device may deduplicate data stored in storage volumes of a distributed computational device, where exemplary storage volumes 114a, 114b, . . . , 114n are shown in FIG. 1, For example, the deduplication application 112a may deduplicate data stored in the storage volumes 114a controlled by the distributed computational device 104a.

Therefore, FIG. 1 illustrates a distributed computing environment 100 in which data and parity fragments of a file are distributed among a plurality of distributed computational devise 104a . . . 104n by a controlling computational device 102. The data and parity fragments allow for redundancy when data is lost in one or more of the storage volumes 114a . . . 114n.

Figure 2:
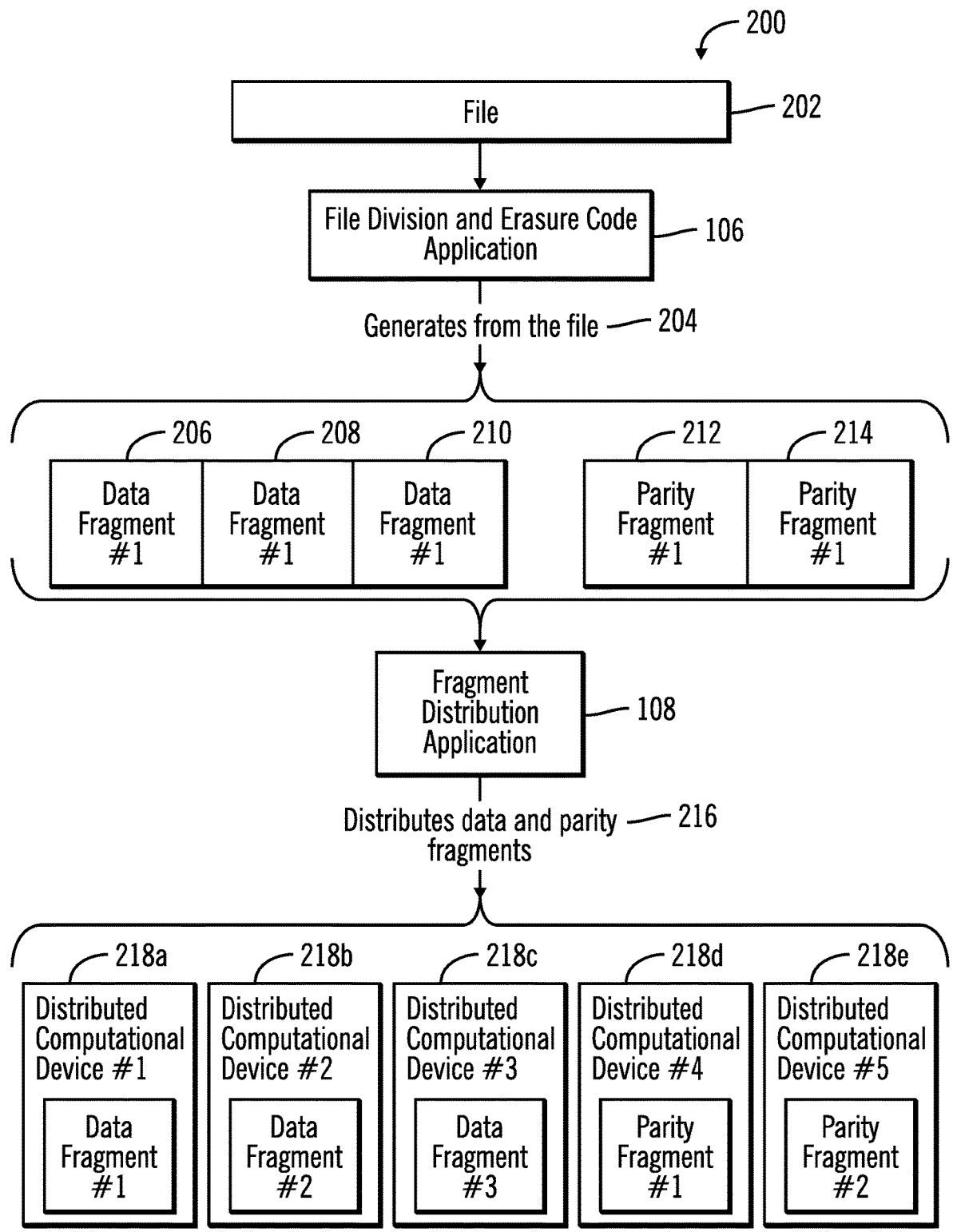
FIG. 2 illustrates a block diagram that how data and parity fragments of a file are distributed among distributed computational devices, in accordance with certain embodiments.

FIG. 2 illustrates a block diagram 200 that how data and parity fragments of a file are distributed among distributed computational devices, in accordance with certain embodiments.

In FIG. 2., the file division and erasure code application 106 that executes in the controlling computational device 102 receives a file 202 for storage in the distributed computing environment 100. The file division and erasure code application 106 generates (shown via reference numeral 204) three data fragments 206, 208, 210 and two parity fragments 212, 214. The file division code in the file division and erasure code application 106 generates the three data fragments 206, 208, 210. The erasure code in the file division and erasure code application 106 generates the two parity fragments 212, 214 from the three data fragments 206, 208, 210.

The fragment distribution application 108 that executes in the controlling computational device 102 distributes (shown via reference numeral 216) the data fragments 206, 208, 210 and the parity fragments 212, 214 into different distributed computational devices 218a, 218b, 218c, 218d, 218e. For example, the three data fragments 206, 208, 210 are placed in distributed computational devices 218, 218b, 218c respectively, and the two parity fragments 212, 214 are placed in distributed computational devices 218d, 218e respectively. In such embodiments, even if two of the distributed computational devices 218a, 218b, 218c, 218d, 218e were to undergo a failure, the file 202 may still be recovered from the remaining distributed computational devices that did not fail.

Therefore FIG. 2 illustrates certain embodiments in which each data and parity fragment of a file is stored in a different distributed computational device for ease of data recovery, in the event of a failure of one or more distributed computational devices or a corruption of one or more data or parity fragments. The embodiment described in FIG. 2 shows the number of parity fragments to be two. However in other embodiments, the number of parity fragments may be different from two (for example there may be ten parity fragments). In certain embodiments if M is the number of parity fragments, a file can be recovered even up to M device failures.

Figure 3:
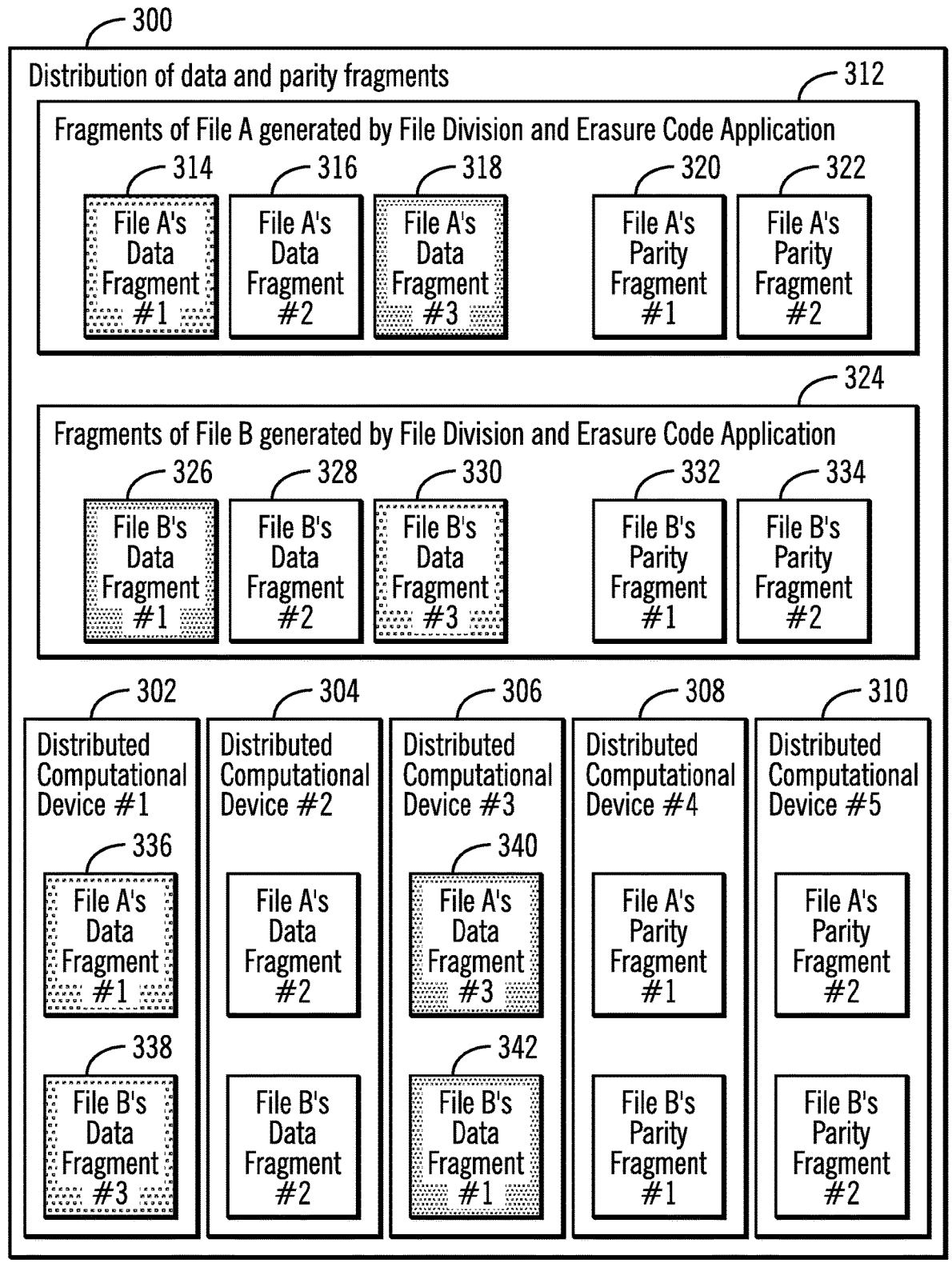
FIG. 3 illustrates a block diagram that how data and parity fragments of a file are distributed among distributed com

FIG. 3 illustrates a block diagram 300 that how data and parity fragments of a file are distributed among distributed computational devices 302, 304, 306, 308, 310 when deduplication is to be performed in the distributed computation devices 302, 304, 306, 308, 310, in accordance with certain embodiments. By allowing deduplication to be performed in the distributed computational devices 302, 304, 306, 308, 310 the amount of storage needed is reduced and the processing load on the controlling computational device 102 is potentially reduced as the controlling computational device 102 may not have to perform deduplication.

FIG. 3 shows in block 312, the data and parity fragments 314, 316, 318, 320, 322 corresponding to a file A as generated by the file division and erasure code application 106. FIG. 3 also shows in block 324, the data and parity fragments 326, 328, 330, 332, 334 corresponding to a file B as generated by the file division and erasure code application 106.

In FIG. 3, File A's data fragment #1 314 is identical in contents to file B's data fragment #3 330, and as a result both File A's data fragment #1 314 and file B's data fragment #3 330 have the same hash value. In order to facilitate deduplication at the distributed computational devices, the fragment distribution application 108 places the File A's data fragment #1 314 and file B's data fragment #3 330 in the same distributed computational device #1 302 as shown via reference numerals 336, 338.

Similarly in FIG. 3, File A's data fragment #3 318 is identical in contents to file B's data fragment #1 326. In order to facilitate deduplication at the distributed computational devices, the fragment distribution application 108 places the File A's data fragment #3 318 and file B's data fragment #1 326 in the same distributed computational device #3 306 as shown via reference numerals 336, 338.

The other data and parity fragments of Files A and B may be placed anywhere among the distributed computational devices provided no two fragments of the same file are placed in the same distributed computational device as this would not provide redundancy.

Therefore, FIG. 3 illustrates certain embodiments in which duplicative data fragments from different files are stored in the same distributed computational device, whenever such storage is possible. In certain embodiments a "Hash Repository" which stores hash value for fragments of the stored files may be maintained for determining duplicative data fragments. In embodiments that have deduplication applications, hash functionality of the deduplication applications may be utilized for the Hash repository. The hash value of data fragments maintained in the hash repository 111 provides a fast comparison to determine whether two data fragments are duplicates. In certain embodiments the hash repository 111 is maintained at the controlling computational device 102. Hash value for each data fragment is calculated at the controlling computational device 102 and stored in the common Hash repository 111, before passing the data fragments to the distributed computational devices.

Figure 4:
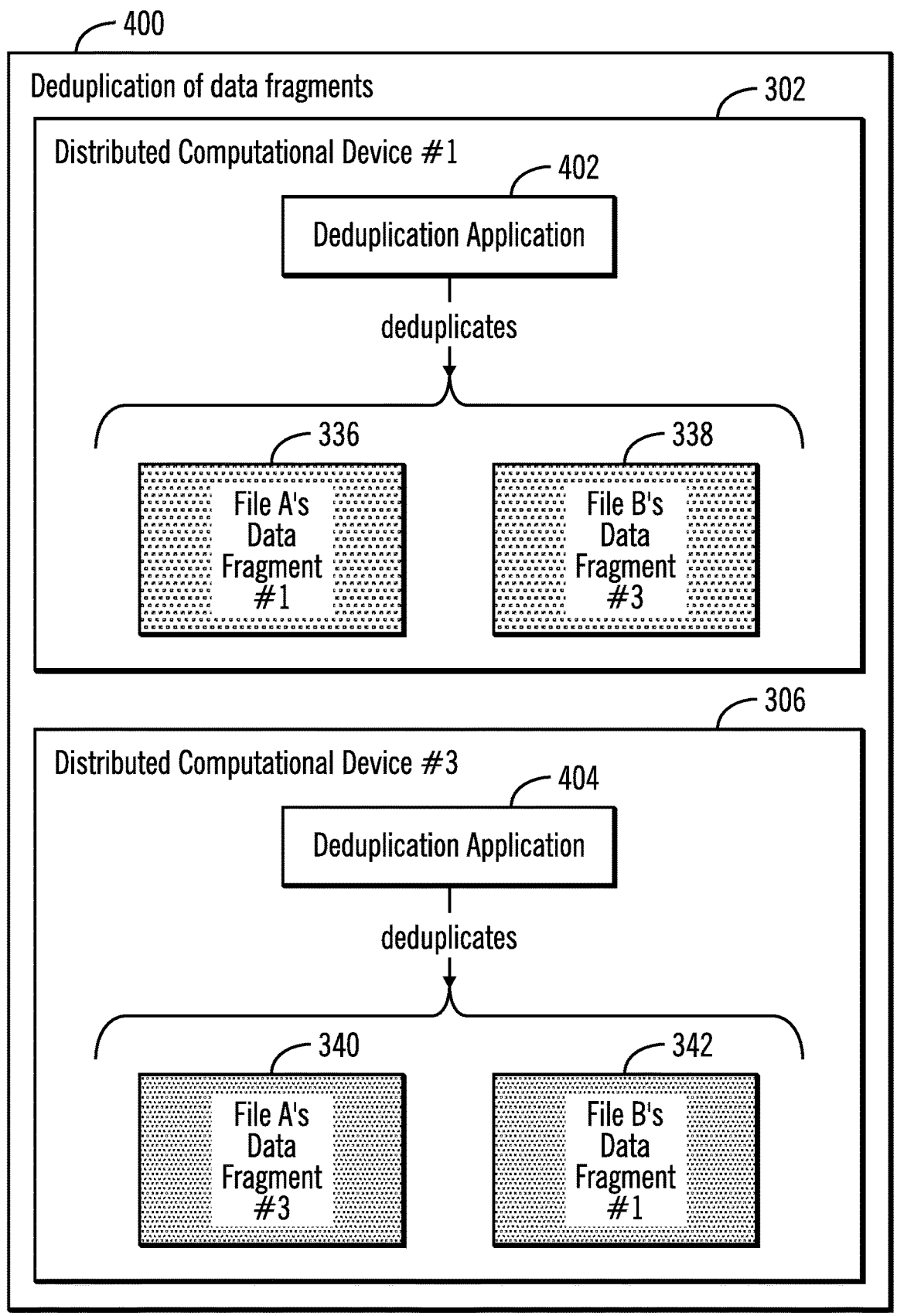
- FIG. 4 illustrates a block diagram that shows deduplication being performed in distributed computational devices, in accordance with certain embodiments.

FIG. 4 illustrates a block diagram 400 that shows deduplication being performed in distributed computational devices, in accordance with certain embodiments. In FIG. 4 the distributed computational device 302 of FIG. 3 is shown as storing the duplicative data fragments 336, 338, and the distributed computational device 306 of FIG. 3 is shown as storing the duplicative data fragments 340, 342.

The deduplication application 402 that executes in the distributed computational device 302 deduplicates the data stored in the data fragments 336, 338, and the deduplication application 404 that executes in the distributed computational device 306 deduplicates the data stored in the data fragments 340, 342. As a result, storage requirements in the distributed computing environments are reduced.

Figure 5:
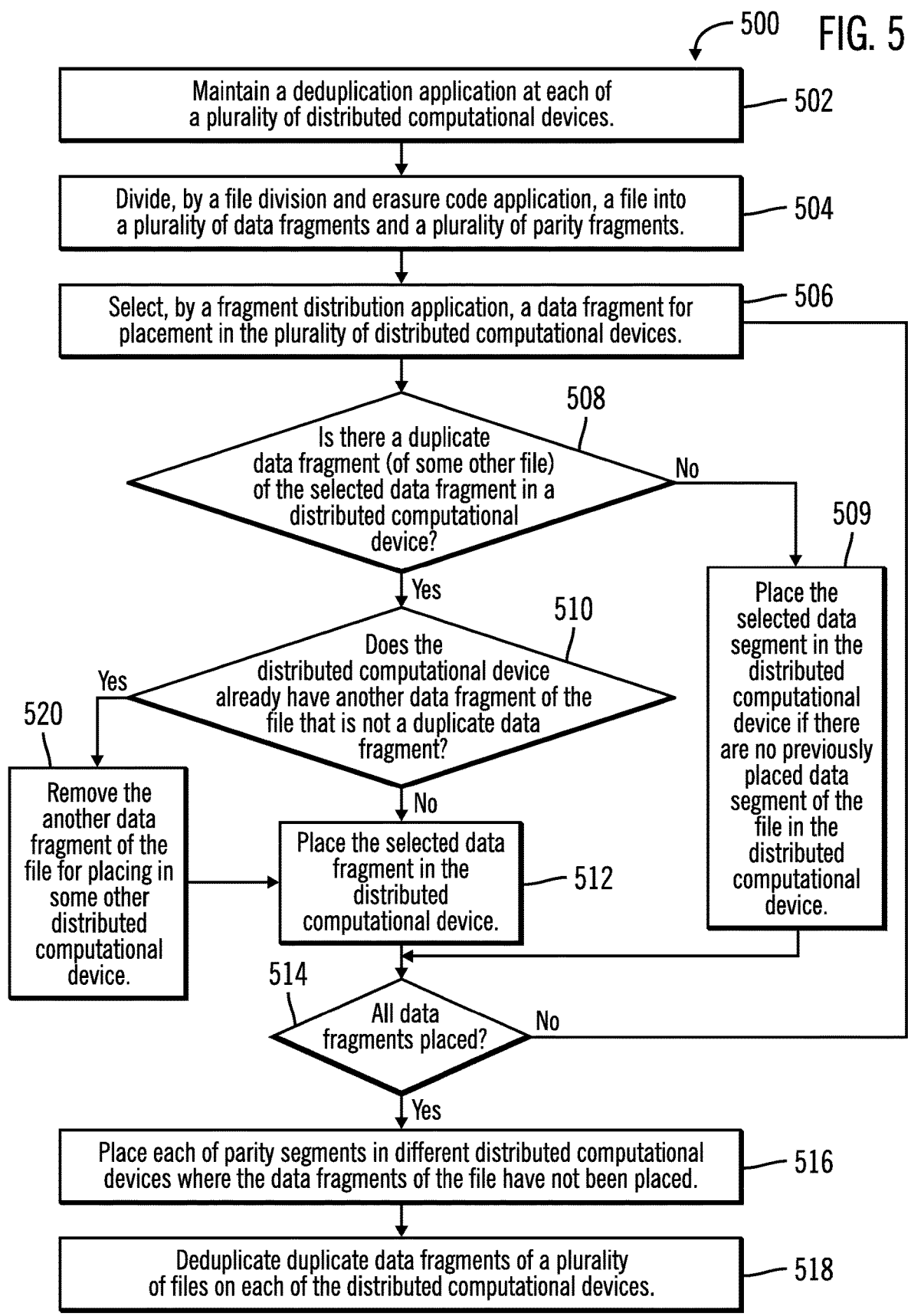
FIG. 5 illustrates a flowchart that shows operations performed in the distributed computing environment, in accordance with certain embodiments.

FIG. 5 illustrates a flowchart 500 that shows operations performed in the distributed computing environment 100, in accordance with certain embodiments. In certain embodiments, the operations shown in FIG. 5 may be implemented in the controlling computational device 102 and the distributed computational devices 104a.

Control starts at block 502 in which a deduplication application 112a . . . 112n is maintained at each of a plurality of distributed computational devices 104a . . . 104n. A file division and erasure code application 106 that executes in the controlling computational device 102 divides (at block 504) a file into a plurality of data fragments and a plurality of parity fragments.

Control proceeds to block 506 in which a fragment distribution application 108 selects a data fragment for placement in the plurality of distributed computational devices 104a . . . 104n. For example, if there are ten data fragments corresponding to the file then one of the ten data fragments is selected for placement in the plurality of distributed computational devices 104a . . . 104n. All of the ten data fragment may ultimately have to be placed in different distributed computation devices. In certain alternative embodiments, depending on the erasure code used, multiple data fragments of a file may be placed in the same distributed computational device.

From block 506 control proceeds to block 508, in which a determination is made as to whether there is a duplicate data fragment (of some other file) of the selected data fragment in a distributed computational device. For example the fragment distribution code 106 may determine that the distributed computational device 104b already stores a data fragment of a previously stored file which is a duplicate of the data fragment of a file A that is to be stored.

If at block 508 it is determined that there is a duplicate data fragment (of some other file) of the selected data fragment in a distributed computational device, then control proceeds to block 510 in which a determination is made as to whether the distributed computation device already has another data fragment of the file that is not a duplicate data fragment. For example, if an attempt to store a data fragment of file A in the distributed computational device 104b is being made, and if another data fragment of file A has previously been stored in computational device 104b, then a determination is made as to whether the previously stored data fragment of file A is not duplicative of another data fragment stored in the distributed computational device 104b.

If at block 510, a determination is made that the distributed computational device does not already have another data fragment of the file that is not a duplicate data fragment, then the selected data fragment is placed (at block 512) in the distributed computational device.

Control proceeds to block 514 in which a determination is made as to whether all data fragments of the file have been placed in the distributed computational devices 104a . . . 104n. If so, each of parity fragments of the file are placed (at block 516) in different distributed computational devices where the data fragments of the file have not been placed. Control then proceeds to block 518 in which the deduplication applications 112a . . . 112n deduplicate duplicate data fragments of a plurality of files on each of the distributed computational devices 104a . . . 104n. The deduplication may in certain embodiments be performed at the time of placing a duplicate data fragment.

If at block 508, a determination is made that there is no duplicate data fragment of the selected data fragment in the distributed computational device then control proceeds to block 509 in which the selected data fragment is placed in the distributed computational device if there are no previously placed data fragment of the file in the distributed computational device and control proceeds to block 514.

If at block 510 a determination is made that the distributed computational device already has another data fragment of the file that is not a duplicate data fragment then the process removes (at block 520) the another data fragment of the file for placing the another data fragment in sonic other distributed computational device. As a result, there is a rearrangement of existing data fragments when control proceeds to block 512 in which the selected data fragment is placed in the distributed computational device.

If at block 614 a determination is made that not all data fragments have been placed control returns to block 506.

Therefore FIG. 5 illustrates certain embodiments in which an attempt is made to have as much deduplication as possible when data fragments are distributed across a plurality of distributed computational devices.

Figure 6:
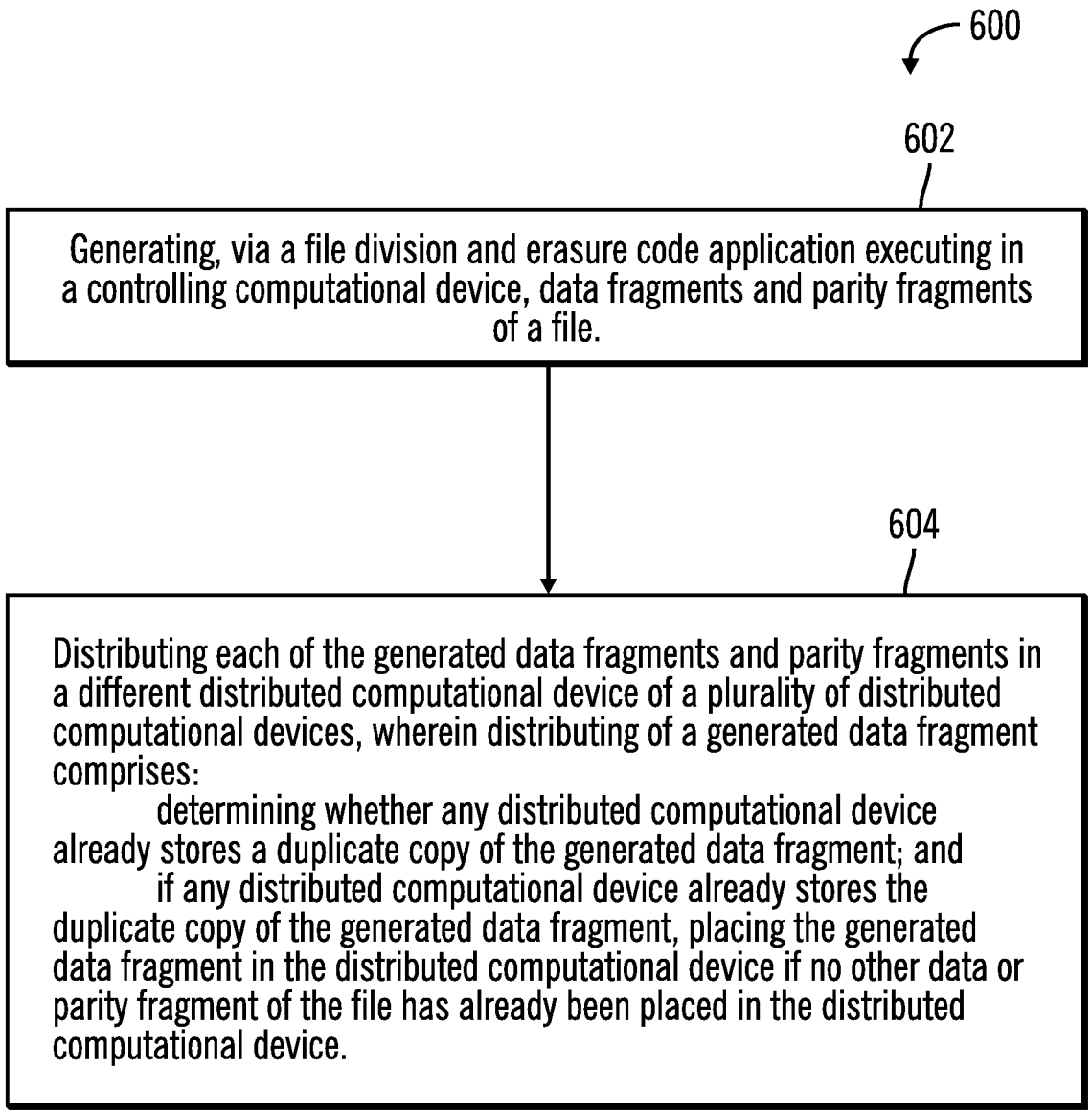
FIG. 6 illustrates a flowchart that shows operations performed by the controlling computational device, in accordance with certain embodiments.

FIG. 6 illustrates a flowchart 600 that shows operations performed by the controlling computational device, in accordance with certain embodiments. In certain embodiments, the operations shown in FIG. 5 may be implemented in the controlling computational device 102.

In FIG. 6, a file division and erasure code application 106 executing in a controlling computational device 102 generates (at block 602) data fragments and parity fragments of a file. Control proceeds to block 604, in which each of the generated data fragments and parity fragments are distributed in a different distributed computational device of a plurality of distributed computational devices 104a . . . 104n, wherein distributing of a generated data fragment comprises determining whether any distributed computational device already stores a duplicate copy of the generated data fragment, and if any distributed computational device already stores the duplicate copy of the generated data fragment, then the generated data fragment is placed in the distributed computational device if no other data or parity fragment of the file has already been placed in the distributed computational device.

Therefore, FIG. 6 illustrates certain embodiments in which a data fragment of a file is placed in a computational device that has a duplicative data fragment of another file. As a result, a deduplication may be performed to reduce the amount of storage space needed to store the data fragment of the file and the duplicate data fragment of the another file, in the distributed computing environment.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 7:
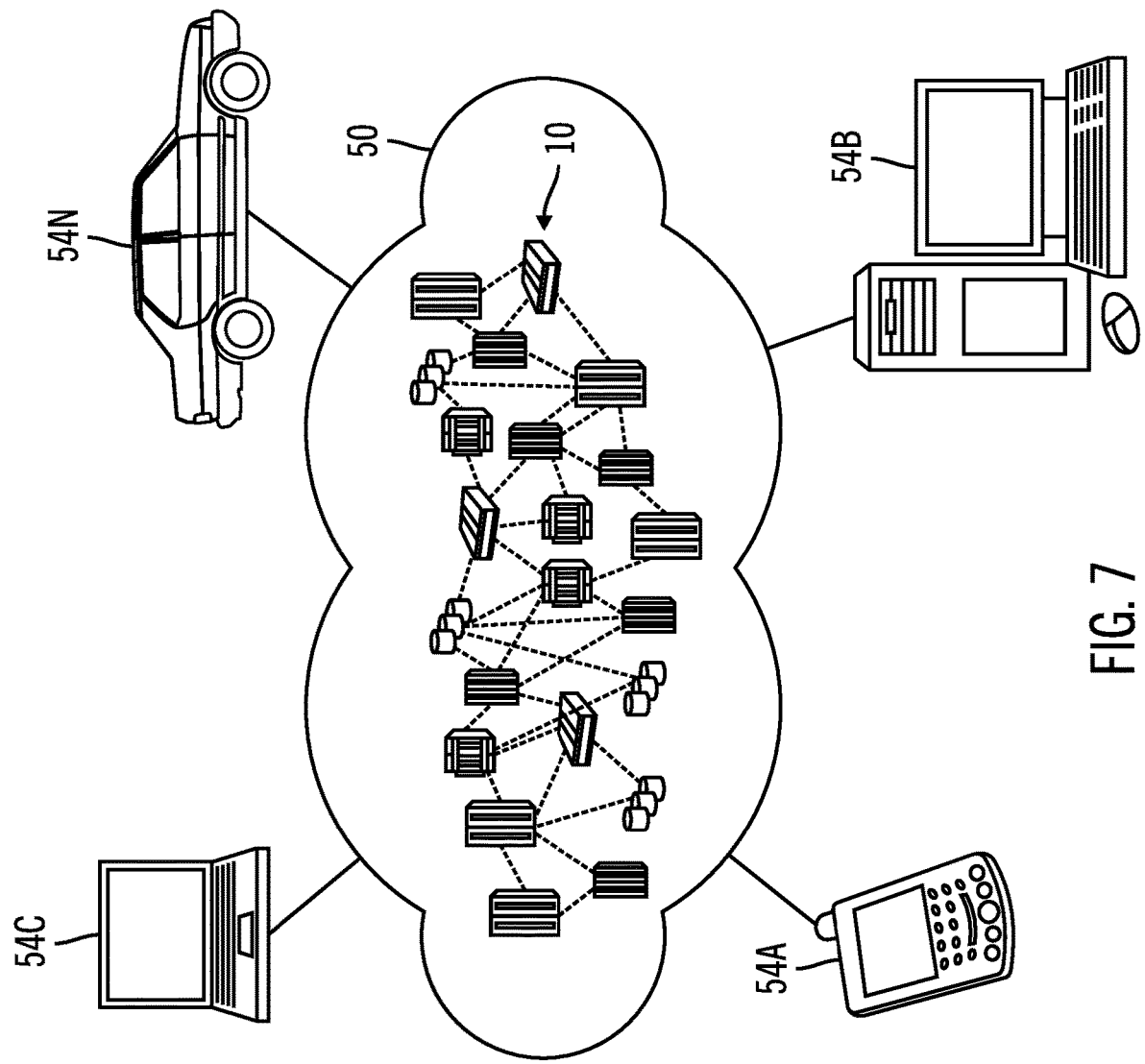
FIG. 7 illustrates a block diagram of a cloud computing environment, in accordance with certain embodiments.

Referring now to FIG. 7, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
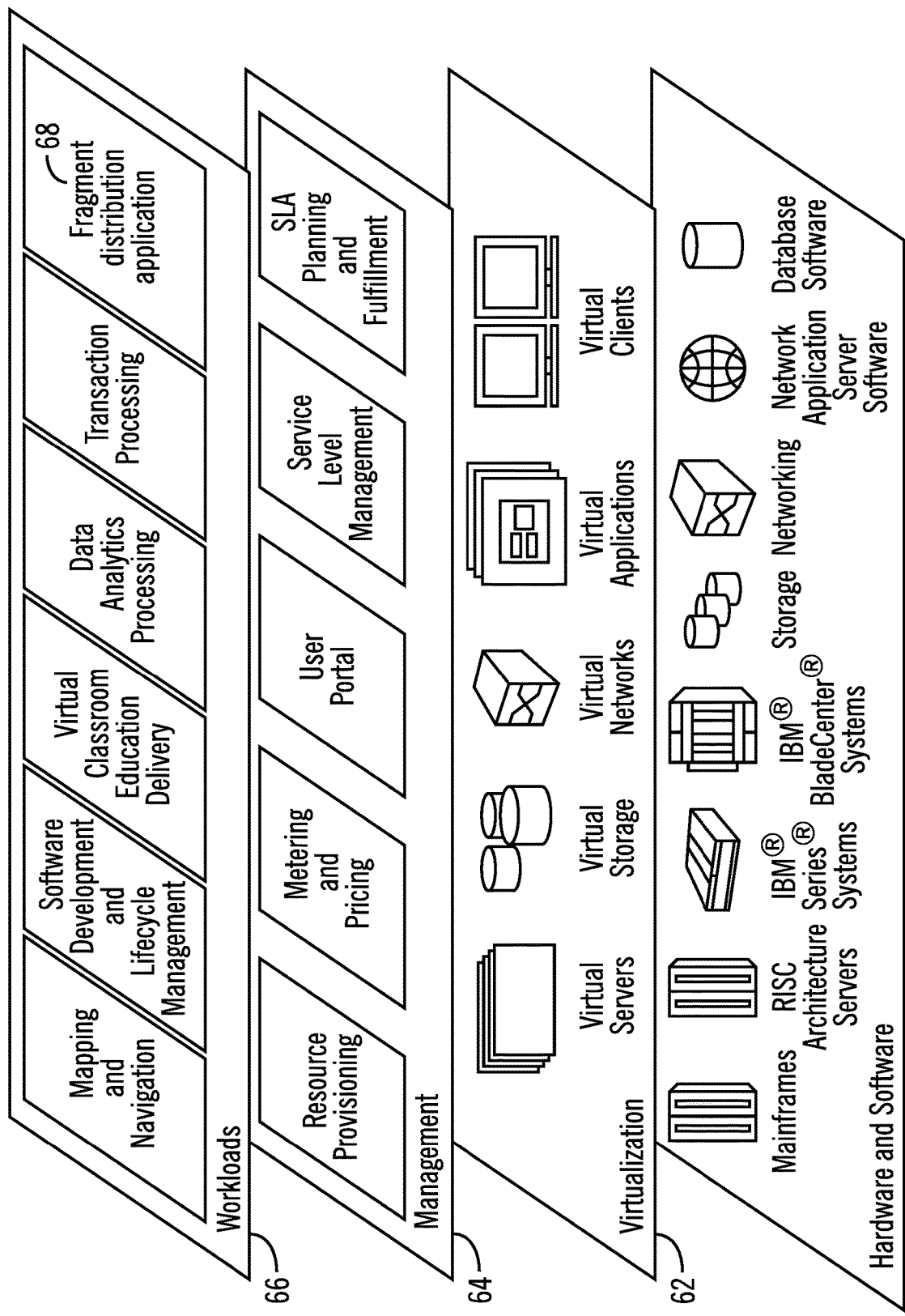
FIG. 8 illustrates a block diagram of further details of the cloud computing environment of FIG. 7, in accordance with certain embodiments.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto.

Hardware and software layer 60 includes hardware and software components. Examples of hardware components include mainframes, in one example IBM zSeries* systems; RISC (Reduced Instruction Set Computer) architecture based servers, in one example IBM pSeries* systems; IBM xSeries* systems; IBM BladeCenter* systems; storage devices; networks and networking components. Examples of software components include network application server software, in one example IBM WebSphere* application server software; and database software, in one example IBM DB2* database software.

* IBM, zSeries, pSeries, xSeries, BladeCenter, WebSphere, and DB2 are trademarks of International Business Machines Corporation registered in many jurisdictions worldwide.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and the fragment distribution application 68 as shown in FIGS. 1-8.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

Figure 9:
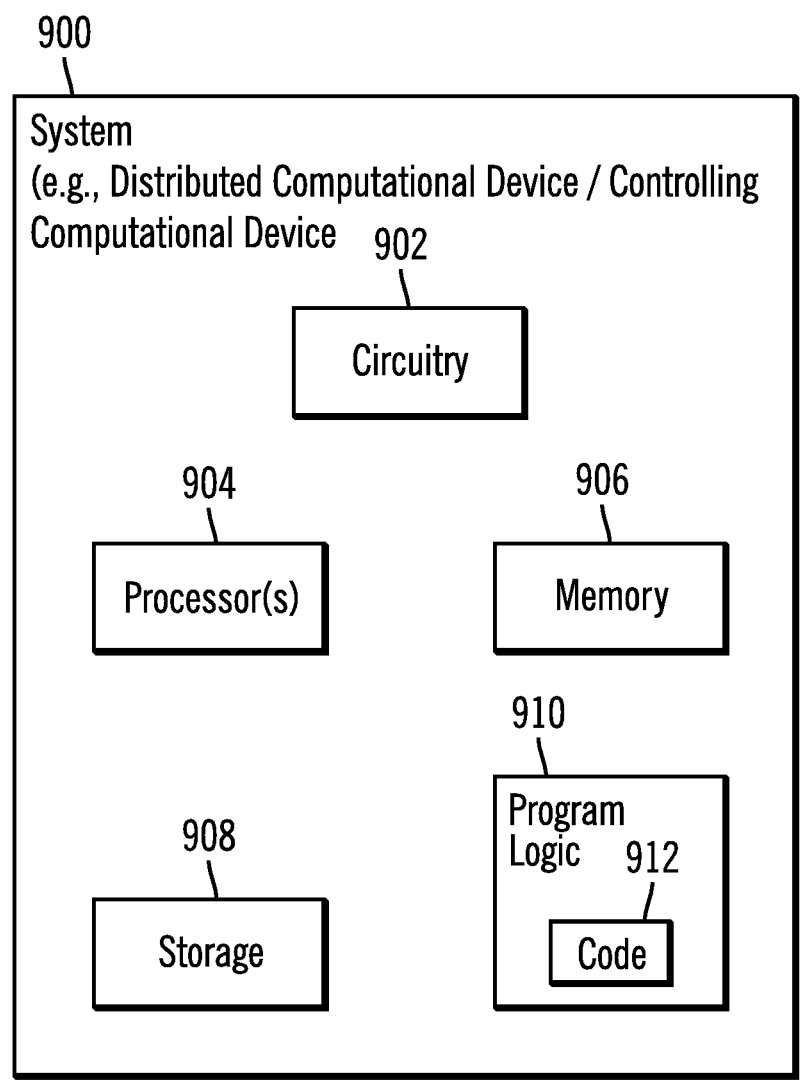
FIG. 9 illustrates a block diagram of a computational system that shows certain elements that may be included in the distributed computational devices or the controlling computational device shown in FIG. 1, in accordance with certain embodiments.

FIG. 9 illustrates a block diagram that shows certain elements that may be included in the controlling computational device 102 or the distributed computational devices 104a . . . 104n in accordance with certain embodiments. The system 900 may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated liking of items does not imply that any or all of the items are mutually exclusive, unless expressly specified otherwise.

The terms "a", an and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended. affiliates.

What is claimed is:

1. A method, comprising:
generating a data fragment of a first file;
determining whether a distributed computational device already stores a duplicate copy of the generated data fragment of the first file, wherein the duplicate copy is a data fragment of a second file; and
before placing the generated data fragment of the first file in the distributed computational device in which the duplicate copy that is a data fragment of the second file is already stored, another data fragment of the first file that is different from the generated data fragment of the first file is removed from the distributed computational device for placement in another distributed computational device.

2. The method of claim 1, the method further comprising:
deduplicating data fragments stored in each of a plurality of distributed computational devices.

3. The method of claim 1, wherein a controlling computational device stores metadata of files stored in a plurality of distributed computational devices.

4. The method of claim 1, wherein a metadata includes a location of each of data fragments and parity fragments in each of a plurality of distributed computational devices.

5. The method of claim 1, wherein the determining of whether the distributed computational device already stores a duplicate copy of the generated data fragment of the first file is performed by using hash values of data fragments of a plurality of files stored in a hash repository in a controlling computational device.

6. The method of claim 1, wherein each of a plurality of distributed computational devices have a deduplication application to deduplicate data fragments, and wherein a number of the data fragments is greater than a number of parity fragments for a file.

7. A system, comprising:
a memory; and
a processor coupled to the memory, wherein the processor performs operations, the operations comprising:
generating a data fragment of a first file;
determining whether a distributed computational device already stores a duplicate copy of the generated data fragment of the first file, wherein the duplicate copy is a data fragment of a second file; and
before placing the generated data fragment of the first file in the distributed computational device in which the duplicate copy that is a data fragment of the second file is already stored, another data fragment of the first file that is different from the generated data fragment of the first file is removed from the distributed computational device for placement in another distributed computational device.

8. The system of claim 7, the operations further comprising:
deduplicating data fragments stored in each of a plurality of distributed computational devices.

9. The system of claim 7, wherein the system comprises a controlling computational device that stores metadata of files stored in a plurality of distributed computational devices.

10. The system of claim 7, wherein a metadata includes a location of each of data fragments and parity fragments in each of a plurality of distributed computational devices.

11. The system of claim 7, wherein the determining of whether the distributed computational device already stores a duplicate copy of the generated data fragment of the first file is performed by using hash values of data fragments of a plurality of files stored in a hash repository in a controlling computational device.

12. The system of claim 7, wherein each of a plurality of distributed computational devices have a deduplication application to deduplicate data fragments, and wherein a number of the data fragments is greater than a number of parity fragments for a file.

13. A computer program product, the computer program product comprising:
a computer readable storage medium having computer readable program code embodied therewith, the computer readable program code configured to perform operations on a processor, the operations comprising:
generating a data fragment of a first file;
determining whether a distributed computational device already stores a duplicate copy of the generated data fragment of the first file, wherein the duplicate copy is a data fragment of a second file; and
before placing the generated data fragment of the first file in the distributed computational device in which the duplicate copy that is a data fragment of the second file is already stored, another data fragment of the first file that is different from the generated data fragment of the first file is removed from the distributed computational device for placement in another distributed computational device.

14. The computer program product of claim 13, the operations further comprising:
deduplicating data fragments stored in each of a plurality of distributed computational devices.

15. The computer program product of claim 13, wherein a controlling computational device stores metadata of files stored in a plurality of distributed computational devices.

16. The computer program product of claim 13, wherein a metadata includes a location of each of data fragments and parity fragments in each of a plurality of distributed computational devices.

17. The computer program product of claim 13, wherein the determining of whether the distributed computational device already stores a duplicate copy of the generated data fragment of the first file is performed by using hash values of data fragments of a plurality of files stored in a hash repository in a controlling computational device.

18. The computer program product of claim 13, wherein each of a plurality of distributed computational devices have a deduplication application to deduplicate data fragments, and wherein a number of the data fragments is greater than a number of parity fragments for a file.

* * * * *